United States Patent [19]

Darredeau et al.

[11] Patent Number: 5,685,172
[45] Date of Patent: Nov. 11, 1997

[54] PROCESS AND DEVICE FOR THE PREPARATION OF A FLOW WHICH IS SUBSTANTIALLY PURIFIED WITH RESPECT TO AT LEAST ONE OF THE IMPURITIES OXYGEN AND CARBON MONOXIDE

[75] Inventors: Bernard Darredeau, Sartrouville; Daniel Gary, Montigny-le-Bretonneux, both of France; Christiane Muller, Hangzhou, China

[73] Assignee: L'Air Liquide, Societe Anonyme Pour L'Etude et L'Exploitation des Procedes Georges Claude, Paris Cedex, France

[21] Appl. No.: 669,957

[22] Filed: Jun. 25, 1996

[30] Foreign Application Priority Data

Jun. 30, 1995 [FR] France ................... 95 07943

[51] Int. Cl.[6] ........................................ F25J 3/00
[52] U.S. Cl. ........................ 62/636; 62/920; 62/924
[58] Field of Search ........................ 62/636, 924, 920

[56] References Cited

U.S. PATENT DOCUMENTS 3,543,529  12/1970  Knapp et al. ................... 62/924
3,805,536  4/1974  Lynn ................................ 62/924
5,106,399  4/1992  Fisher .............................. 62/22

FOREIGN PATENT DOCUMENTS 0 584 747  3/1994  European Pat. Off. .
0 590 946  4/1994  European Pat. Off. .
0 662 595  7/1995  European Pat. Off. .

*Primary Examiner*—Ronald C. Capossela
*Attorney, Agent, or Firm*—Young & Thompson

[57] ABSTRACT

A process and apparatus for preparing a flow which is substantially purified with respect to at least one of the impurities $O_2$ and CO, according to which:

a) a flow to be purified, comprising at least 90 mol % of a compound chosen from nitrogen, helium, neon, argon, krypton, xenon or a mixture of these compounds and at least one of the impurities $O_2$ and CO, is cooled to a temperature of less than $-40°$ C.;

b) the cooled flow is passed through an adsorbent for the adsorption of at least one of the impurities $O_2$ and CO, the adsorbent comprising at least one porous metal oxide;

c) a flow which is substantially purified with respect to at least one of the impurities $O_2$ and CO is recovered.

15 Claims, 2 Drawing Sheets

PROCESS AND DEVICE FOR THE PREPARATION OF A FLOW WHICH IS SUBSTANTIALLY PURIFIED WITH RESPECT TO AT LEAST ONE OF THE IMPURITIES OXYGEN AND CARBON MONOXIDE

FIELD OF THE INVENTION

The present invention relates to a process and a device for the preparation of a flow of a chemically inert compound such as nitrogen and the rare gases, substantially purified with respect to at least one of the impurities oxygen and carbon monoxide.

BACKGROUND OF THE INVENTION

Inert compounds such as nitrogen and the rare gases, namely helium, neon, argon, krypton, xenon and mixtures thereof, are commonly employed in a number of industries, in particular the electronics industry. Quite particularly, the latter requires the inert compounds to be as pure as possible and, in particular, free from their impurities oxygen ($O_2$) and carbon monoxide (CO).

Patent Application EP-A-0,509,871 describes a process for producing argon, according to which impure argon, having an oxygen content of less than approximately 1000 ppm (parts per million) by volume is reacted with hydrogen in excess at close to ambient temperature, in a catalyst bed consisting of particles of at least one metal from the platinum group, which are supported by a particulate support with high specific surface.

Patent Application EP-A-0,444,422 describes a process for removing oxygen contained at a level of 0.8 mol % in hot argon by means of a bed of one or more reducing metals of the getter type. This getter may contain copper, nickel or other metals which chemically adsorb oxygen and can be regenerated with hydrogen.

Furthermore, patent U.S. Pat. No. 3,996,028 discloses a process for purifying argon by passing this argon through a type-A synthetic zeolite, which makes it possible to adsorb the oxygen alone. The adsorption is carried out using a zeolite whose temperature is kept between −186° C. (boiling point of argon) and −133° C.

SUMMARY OF THE INVENTION

The first subject of the present invention is a process for the preparation of a flow which is purified with respect to the impurities CO and $O_2$ which it contains, this flow comprising at least 90 mol % of an inert compound chosen from nitrogen and the rare gases, it being possible for this process to be implemented for flows having a low temperature, generally less than −40° C.; this flow being in the gas state or the liquid state.

According to a second aspect, the invention furthermore relates to a device for the preparation of a flow which is purified with respect to at least one of the impurities $O_2$ and CO.

The invention then consists of a process for preparing a flow which is substantially purified with respect to at least one of the impurities $O_2$ and CO, characterized in that:

a) a flow to be purified, comprising on the one hand at least 90 mol % of a compound chosen from nitrogen, helium, neon, argon, krypton, xenon or a mixture of these compounds and, on the other hand, at least one of the impurities $O_2$ and CO, is cooled to a temperature of less than −40° C., b) the cooled flow is passed through an adsorbent for the adsorption of at least one of the impurities $O_2$ and CO, the adsorbent comprising at least one porous metal oxide;

c) a flow which is substantially purified with respect to at least one of the impurities $O_2$ and CO is recovered, a process according to which the flow consists of liquid nitrogen being excluded.

BRIEF DESCRIPTION OF THE DRAWINGS

The invention will now be described in detail with reference to the following description and to the figures.

DETAILED DESCRIPTION OF THE INVENTION

Figure 1:
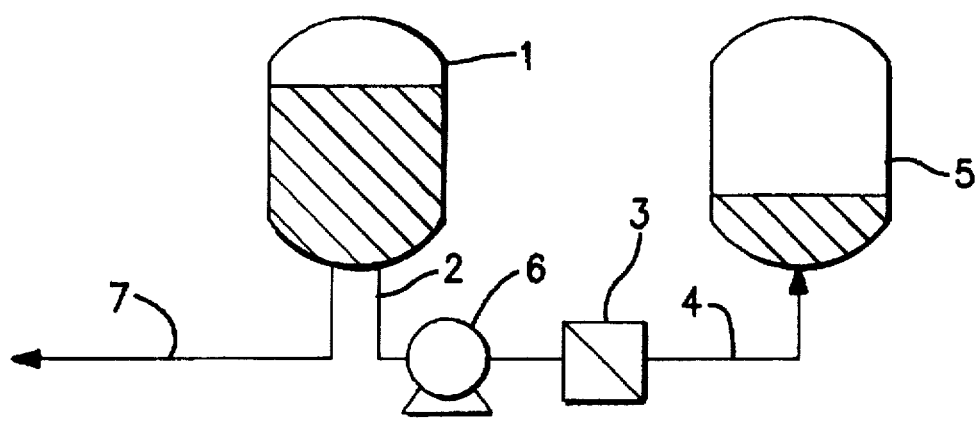
FIG. 1 represents a device for removing the impurities $O_2$ and CO present in a flow of a liquid rare gas contained in a storage tank.

The flow to be purified generally comprises at least 96 mol % of a compound chosen from nitrogen and the rare gases, namely helium, neon, argon, krypton and xenon. When the rare gas is argon, the complement to 100% is usually composed of nitrogen and the impurity $O_2$.

The flow to be purified generally comprises less than 1000 ppm by volume of $O_2$ impurities, generally less than 100 ppm by volume of $O_2$ impurities. When the flow to be purified essentially consists of nitrogen gas, its carbon monoxide content may be less than 30 ppm by volume, more generally a content of between 0.15 and 1.5 ppm by volume. When the flow to be purified essentially consists of one or more rare gases, for example argon, it usually contains no, or very little, carbon monoxide. However, such an impurity may accidentally contaminate the inert compound. In this case, the process according to the invention can be implemented in order to remove the CO at a content of as much as 5 ppm by volume in the rare gas.

The process according to the invention is more particularly suitable for purifying a flow cooled to a temperature of less than a temperature T, T being equal to $P_e+30°$ C. "$P_e$" indicates the boiling point of the flow at the working pressure. The flow treated may be in the gas state or, according to an advantageous characteristic of the process of the invention, in the liquid state. More particularly, the flow to be purified consists of argon gas cooled to a temperature of less than −130° C. or a mixture of krypton and xenon cooled to a temperature of less than −100° C., the temperatures being measured at the working pressure. According to a particularly advantageous characteristic of the process of the invention, the flow to be purified consists of liquid argon.

In the context of the present invention, the term "porous metal oxide" is taken to mean both oxides of a single metal and mixed oxides comprising a plurality of metals. Silicon is not here considered to be a metal. Thus, zeolites consisting of $SiO_2$ patterns are not metal oxides in the context of the invention. Metal oxides which may be mentioned are, more particularly, the oxides of the transition metals, in particular those in groups IVB, VB, VIIIB and IB of the Periodic Table which have an atomic number of between 22 and 79. Of these metals, copper, cobalt, nickel, manganese, silver and iron, taken separately or in the form of mixed oxides, are preferred.

A metal oxide comprising a mixed copper and manganese oxide and, if appropriate, other transition metal oxides, is quite particularly preferred. Advantageously, such mixed copper and manganese oxides are those known by the term "hopcalites". Hopcalites are compounds which are well-known as catalysts making it possible to oxidize carbon monoxide at normal temperature. Further to manganese oxide ($MnO_2$) and copper oxide (CuO), the hopcalite may contain other metal oxides, in particular cobalt and silver oxides. In this regard, mention may, in particular, be made of the hopcalites containing (% by weight) 50% of $MnO_2$, 30% of CuO, 15% of $Co_2O_3$ and 5% of $Ag_2O$. A hopcalite which is quite particularly preferred according to the present invention is, however, a binary hopcalite essentially comprising $MnO_2$ and CuO and, if appropriate, traces of at least one metal chosen from the group consisting of platinum, palladium, osmium, iridium, rhodium and ruthenium. The latter type of hopcalite more particularly comprises 40 to 70% by weight of $MnO_2$ and 25 to 50% by weight of CuO. Even more preferably, such a hopcalite comprises approximately 60% by weight of $MnO_2$ and 40% by weight of CuO.

An adsorbent according to the present invention usually has a mean pore diameter of more than 0.4 nm, preferably between 0.5 and 4 nm. The pore volume in this adsorbent may be more than 0.1 $cm^3/g$, preferably between 0.15 and 5 $cm^3/g$. The specific surface may be more than 150 $m^2/g$, preferably between 150 and 300 $m^2/g$. The adsorbent may be in the form of a powder, sticks, or preferably in the form of granules or balls. The diameter of these granules and balls may be between 1 and 5 mm.

When it is in the gas state, the flow to be purified according to the present invention is usually subjected to a pressure of between 1 and 200 bar, preferably 1 to 15 bar. When this flow is in the liquid state, it is usually subjected to a pressure of between 1 and 20 bar, preferably between 1 and 15 bar. The cooled flow which is passed through the adsorbent usually has a linear velocity of more than $10^{-3}$ m/s, preferably between $10^{-3}$ and $2.10^{-2}$ m/s.

After the impurities $O_2$ and/or CO have been removed, the adsorbent employed can be regenerated in the conventional way, using a regeneration gas. This regeneration gas can be passed through the adsorbent in cocurrent flow, or preferably in countercurrent flow with respect to the flow to be purified. The gas usually consists of nitrogen gas or a mixture of nitrogen gas and a reducing gas such as a hydrocarbon, or preferably hydrogen. Such a mixture may contain less than 5 mol % of reducing gas. The nitrogen gas used as regeneration gas may be produced by the vaporization of nitrogen purified according to the process of the invention, as described above. The temperature of the regeneration gas may be between approximately 100° C. and 250° C., preferably between 150° C. and 250° C.

The adsorbent may be divided into two separate treatment zones, mounted in parallel, one of these zones being regenerated while the other is in contact with the flow to be purified.

Before first use of the adsorbent with a view to removing the said impurities $O_2$ and CO from the flow to be purified, the said adsorbent may be activated, in particular with a view to reducing it and removing the traces of water which it might contain. This activation can be carried out at a temperature between 150° C. and 300° C., preferably of the order of 250° C. It is advantageously carried out under flushing with an atmosphere consisting of nitrogen and hydrogen.

Before or after the removal of the impurities $O_2$ and CO according to the process of the invention, the flow which is treated may have other impurities than these removed by methods which are known per se. Thus, if the flow which is treated contains hydrogen, the latter may be removed by distillation. The presence of hydrogen is more particularly noteworthy when the flow which is treated essentially consists of nitrogen. When the flow which is treated essentially consists of a rare gas, in particular argon, obtained by air distillation, it is generally necessary to remove all traces of nitrogen from it. This removal can be carried out in the conventional way, in a denitrogenation column, for example according to the process described in Patent Application EP-A-0,509,871.

The process according to the invention makes it possible to obtain a flow comprising less than 100 ppb, or less than 10 ppb and even less than 2 ppb, with respect to each of the impurities $O_2$ and CO.

According to another aspect, the invention relates to a device for the preparation of a flow which is substantially purified with respect to at least one of the impurities $O_2$ and CO, the flow comprising at least 90 mol %, preferably at least 96 mol %, of a compound chosen from nitrogen and a rare gas such as helium, neon, krypton, xenon or more particularly argon, or a mixture of these compounds. This device is characterized in that it comprises a source of the flow to be purified, connected to the entry of at least one adsorption zone, this adsorption zone comprising an adsorbent for adsorbing at least one of the impurities $O_2$ and CO, the said adsorbent essentially consisting of a porous metal oxide. The exit of the adsorption zone is provided with a connection conduit which leads into a storage tank or into a station for using the flow which is purified with respect to at least one of the impurities $O_2$ and CO. When the flow to be purified consists essentially of one or more rare gases in the liquid state, it may, after purification, be vaporized with a view to subsequent applications.

FIG. 1 represents a device according to the invention, comprising a source 1 of liquid argon to be purified with respect to its impurity $O_2$ and, if appropriate with respect to its impurity CO, consisting of a fixed liquid-argon storage tank. The latter is connected via a conduit 2, fitted with a pump 6, to the entry of a reactor 3 comprising at least one adsorbent according to the invention, based on a porous metal oxide making it possible to remove one or more of the impurities. According to a particularly advantageous aspect of the invention, the adsorbent is a mixed copper and manganese oxide, preferably a hopcalite.

The exit of the reactor 3 is fitted with a connection conduit 4 opening into a tank 5 for storing purified liquid argon. The liquid argon source 1 is also fitted with a conduit 7 for feeding impure liquid argon to the site where it is used (not represented).

The device represented in FIG. 1 makes it possible to deliver purified or unpurified liquid argon, on demand and according to the requirements of the user. This device represented in FIG. 1 can be fitted easily at the premises of the liquid argon user, insofar as it adds only a reactor 3 and connection means 2 and 4 to a plant already delivering impure liquid argon.

Figure 2:
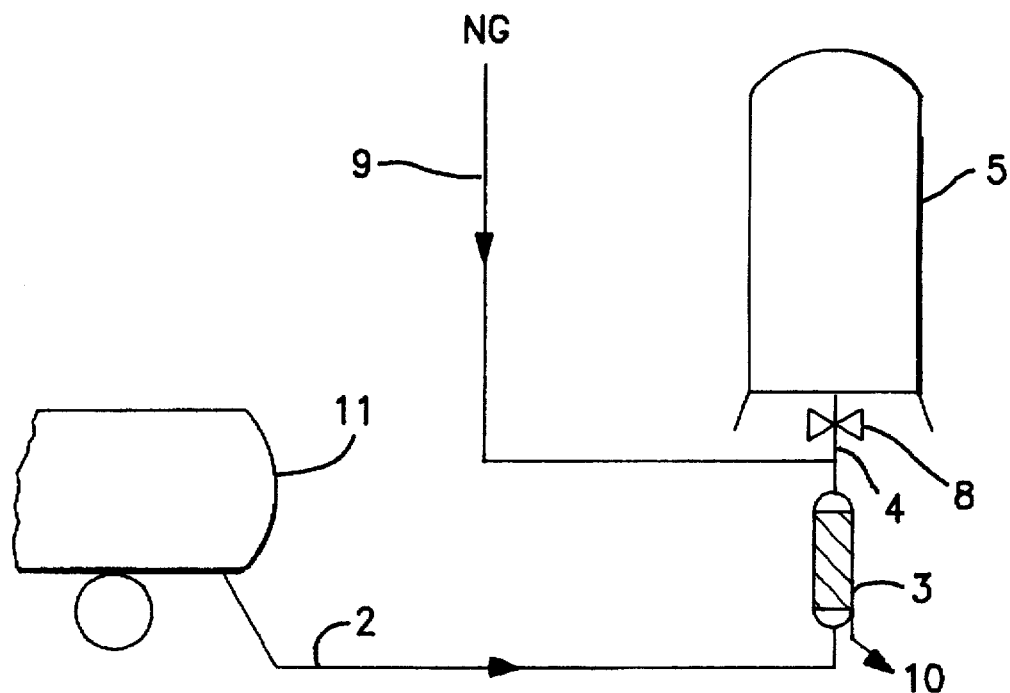
FIG. 2 represents a device for removing the impurities $O_2$ and CO contained in a liquid rare gas, at a transfer end-point.

FIG. 2 represents a device according to the invention, including a source of liquid argon to be purified, consisting of a mobile liquid-argon storage tank 11, in particular the tank of a tanker. The latter is connected via a conduit 2 to the entry of a reactor 3 which comprises at least one adsorbent according to the invention, comprising a porous metal oxide making it possible to remove the impurity $O_2$ and, if appropriate, the impurity CO, which are contained in the liquid argon. The exit of the reactor 3 is fitted with a connection conduit 4, provided with a valve 8, leading into a tank 5 for storing purified liquid argon. The reactor 3 is also connected via a conduit 9 to a nitrogen gas source NG (not represented). The nitrogen gas makes it possible to regenerate the adsorbent by flushing in countercurrent flow. The nitrogen gas is discharged from the reactor 3 via the conduit 10.

The device represented in FIG. 2 makes it possible to purify the liquid argon leaving the tank 11, immediately before it is stored in the storage tank 5.

Figure 3:
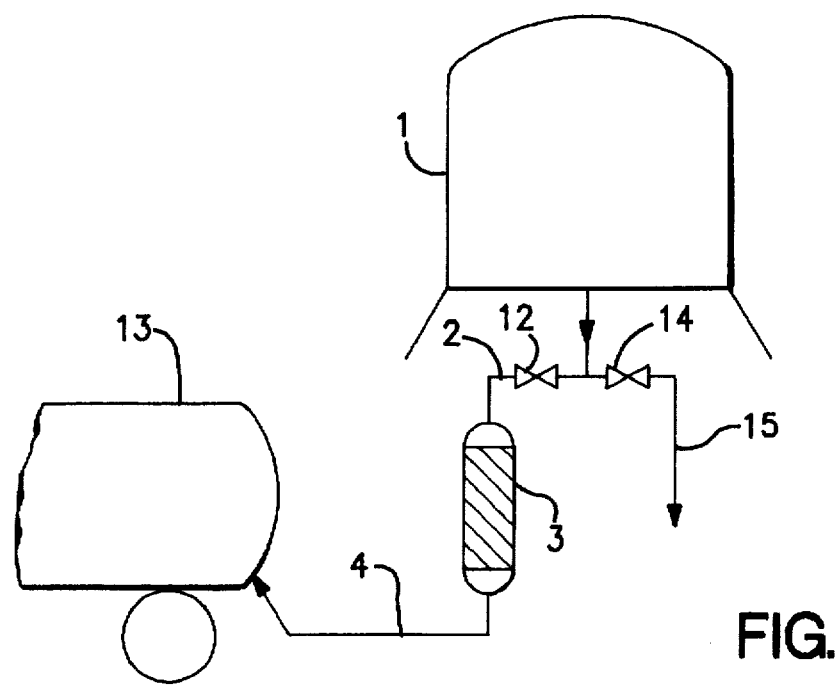
FIG. 3 represents a tank for storing a liquid rare gas, provided with a means for purifying this liquid rare gas which is connected to a tank for transporting it.

The device represented in FIG. 3 includes a fixed tank 1 for storing liquid argon to be purified, connected via a conduit 2, fitted with a valve 12, to the entry of a reactor 3 which includes an adsorbent as defined above. The exit of this reactor is connected via a conduit 4 to a mobile tank 13 for storing purified liquid argon. The conduit 2 is provided with a branch conduit 15 fitted with a valve 14.

The valve 12 is opened in order to fill the mobile storage tank 13. The impure liquid argon is conveyed from the storage tank 1, via the conduit 2, into the reactor 3. The purified liquid argon is then conveyed from the reactor 3 into the mobile tank 13. The valve 14 may be open or closed. When it is open, it is possible to fill another mobile or fixed tank (not represented) with impure liquid argon, at the same time as the tank 13 is filled.

Figure 4:
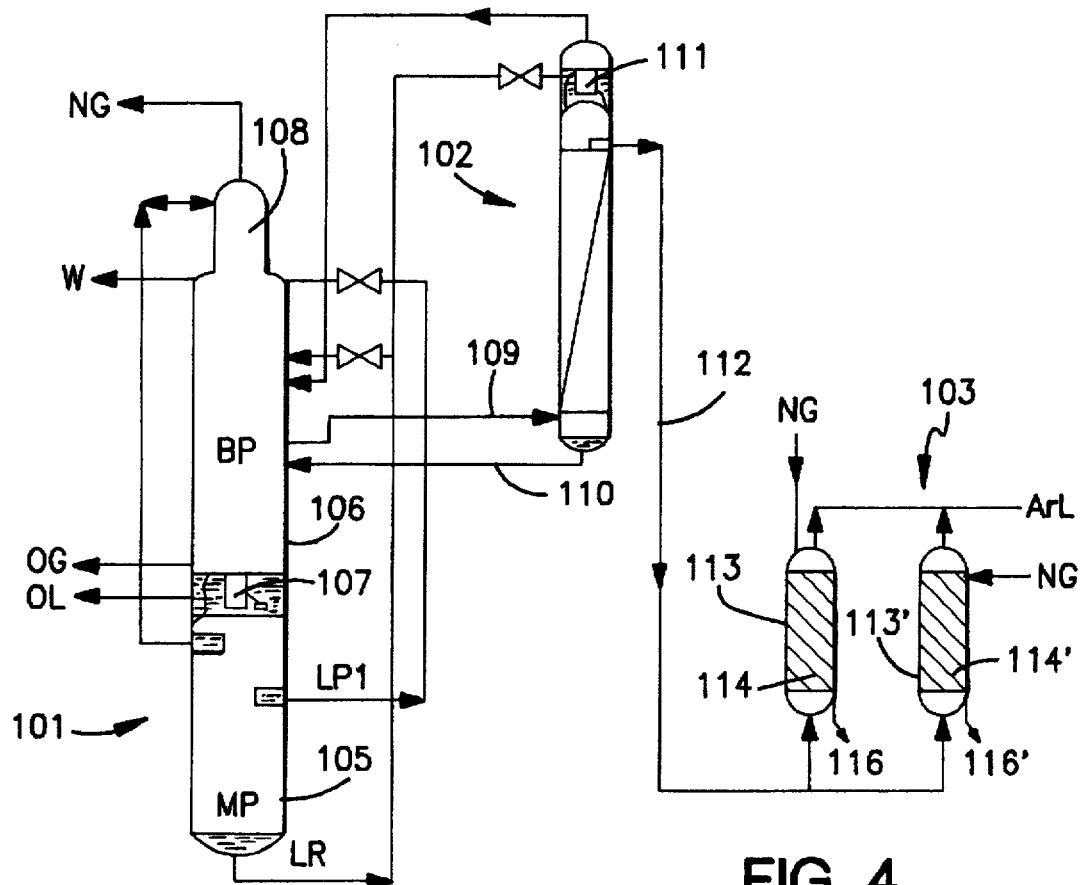
FIG. 4 represents a device for the preparation of high-purity liquid argon from air.

FIG. 4 represents a plant according to the invention, comprising an air distillation apparatus intended to produce, at low pressure, that is to say at close to atmospheric pressure, oxygen gas OG, liquid oxygen OL, nitrogen gas NG and, at a pressure of the order of $1.8 \times 10^5$ Pa, liquid argon ArL. This plant comprises a double distillation column 101 of the type referred to as having a "minaret" 108, a column 102 for producing impure liquid argon and an apparatus 103 for removing oxygen from the impure argon. The double column 101 comprises a medium-pressure column 105, operating for example at a pressure of $6 \times 10^5$ Pa, on top of which there is a low-pressure column 106 operating, for example, slightly above atmospheric pressure. The column 106 comprises a return conduit 110 and a conduit 109 referred to as the "argon tap". The conduits 109 and 110 are connected to the column 102. The air to be treated is introduced at the base of the column 105, and the head vapour (nitrogen) of the latter is brought into heat-exchange contact with the vessel liquid (oxygen) of the column 106 by means of an evaporator/condenser 107.

The column 102 includes at least 100 theoretical plates, preferably 100 to 130 theoretical plates. This column may be fitted with packing, in particular organized packing, advantageously corrugated-crossed packing as described in the document WO-A-89/10527. The impure argon thus contains at most approximately 100 ppm by volume, depending on the number of theoretical plates used. The column 102 includes a head condenser 111 cooled by expanded rich liquid.

The mode of operation of the columns 101 and 102 is described in Patent Application EP-A-0,509,871. This mode of operation is incorporated in the present description by way of reference.

The apparatus 103 comprises two reactors 113 and 113', each filled with an adsorbent according to the invention, for example a hopcalite. When one of the reactors 113 or 113' is being regenerated, the other is used for purifying the liquid argon leaving the column 102 via the conduit 112. The latter is, if necessary, provided with a cryogenic pump. The liquid argon is recovered at the exit of the reactor 113 or 113'. The adsorbents are regenerated by flushing with nitrogen gas in countercurrent flow. The nitrogen gas is removed from the reactors 113 and 113' via the conduits 116 and 116'.

The purified liquid argon can be sent directly to a storage zone or a utilization station, or else can be previously treated in a conventional denitrogenation column with a view to removing the nitrogen impurity which it contains.

The devices represented in FIGS. 1 to 3 can produce high-purity argon in the liquid state, free of its impurities $O_2$ and, if appropriate, CO. These devices can also be employed for the preparation of other inert gases in the liquid state, namely neon, xenon, krypton and helium or a mixture of these compounds with one another and/or with argon.

The following examples are intended to illustrate the present invention.

In the examples, the adsorbent employed was a hopcalite marketed either by the company Dräger and comprising approximately 63% of $MnO_2$ and approximately 37% of CuO, or by the company Molecular Products and comprising approximately 60% by weight of $MnO_2$ and approximately 40% by weight of CuO.

The carbon monoxide impurity was measured using an RGA3 chromatograph marketed by the company Trace Analytical. The oxygen impurity was measured continuously using an OSK analyser marketed by the company Osaka Sanso Kogyo Ltd. The detection threshold of the RGA3 chromatograph is less than 2 ppb (parts per billion by volume) for carbon monoxide. The detection threshold of the OSK analyser is 2 ppb for oxygen.

EXAMPLE 1

Treatment of nitrogen gas at $-170°$ C. at 8 bar.

A nitrogen gas flow at $-170°$ C., pressurized to 8 bar, was passed through an adsorbent of the hopcalite type marketed by the company Dräger, contained in a 3 litre reactor. The nitrogen gas contained 1 ppm by volume of CO and 3 ppm by volume of $O_2$ at the entry of the reactor. The flow rate was 33 $Sm^3/h$.

After 80 hours of treatment, the residual $O_2$ and CO content was measured at the exit of the reactor. The oxygen content in the nitrogen was less than 2 ppb and that of CO was less than 100 ppb.

EXAMPLE 2

Treatment of liquid argon at $-165°$ C., at 8 bar.

A liquid argon flow, pressurized to 8 bar, was passed at a flow rate of 33 $Sm^3/h$ through an adsorbent of the hopcalite type, marketed by the company Dräger. The adsorbent was contained in a 3 litre reactor. The oxygen content in this liquid argon was 3 ppm by volume at the entry of the reactor.

After 32 hours of treatment, the residual oxygen content at the exit of the reactor was 2 ppb.

EXAMPLE 3

Treatment of liquid argon at $-165°$ C., at 8 bar.

A liquid argon flow at $-165°$ C., pressurized to 8 bar, was passed through an adsorbent of the hopcalite type, marketed by the company Molecular Products. The adsorbent was contained in a 3 litre reactor. The flow rate was 33 $Sm^3/h$. The oxygen content in this liquid argon was 3 ppm by volume at the entry of the reactor. It was furthermore artificially polluted with 1 ppm by volume of CO.

After 45 hours of treatment, the oxygen content in the liquid argon was only 2 ppb and that of CO was not detected.

EXAMPLE 4

Treatment of argon gas at −150° C., at 8 bar.

An argon gas flow at −150° C., pressurized to 8 bar, was passed through an adsorbent of the hopcalite type marketed by the company Molecular Products. The adsorbent was contained in a 3 litre reactor. The flow rate was 33 $Sm^3/h$. The oxygen content in this argon gas was 3 ppm by volume at the entry of the reactor. It was furthermore artificially polluted with 1 ppm by volume of CO.

After 40 hours of treatment, the oxygen content in the argon gas was 2 ppb and that of CO was not detected.

EXAMPLE 5

Treatment of argon gas at −150° C., at 8 bar.

An argon gas flow at −150° C., pressurized to 8 bar, was passed through an adsorbent of the hopcalite type marketed by the company Molecular Products. The adsorbent was contained in a 3 litre reactor. The flow rate was 33 $Sm^3/h$. The oxygen content in this argon gas was 20 ppm by volume at the entry of the reactor.

After 15 hours of treatment, the oxygen content in the argon gas was 2 ppb.

We claim:

1. Process for preparing a flow which is substantially purified with respect to at least one of the impurities $O_2$ and CO, the flow to be purified being other than liquid nitrogen, and comprising at least 90 mol % of a compound selected from the group consisting of nitrogen, helium, neon, argon, krypton, xenon or a mixture thereof, the process comprising:

a) passing the flow to be purified through an adsorbent comprising at least one porous metal oxide, said flow having a temperature of less than −40° C.; and b) recovering a flow which is substantially purified with respect to at least one of the impurities $O_2$ and CO.

2. Process according to claim according to claim 1, wherein the flow to be purified has a temperature of less than $T=P_e+30°$ C., wherein $P_e$ is the boiling point of the flow at the working pressure.

3. Process according to claim 1, wherein the flow to be purified is in the liquid state.

4. Process according to claim 1, wherein the flow to be purified consists essentially of liquid argon.

5. Process according to claim 1, wherein the flow to be purified consists essentially of argon gas having a temperature of less than −130° C., measured at the working pressure.

6. Process according to claim 1, wherein the flow to be purified comprises less than 100 ppm by volume of the impurity $O_2$.

7. Process according to claim 1, wherein the adsorbent consists of one of an oxide of a transition metal and a mixed oxide of at least two transition metals.

8. Process according to claim 1, wherein the adsorbent is a hopcalite comprised of a mixed copper and manganese oxide.

9. Process according to claim 8, wherein the adsorbent comprises 40–70% by weight of a manganese oxide and 25%–50% by weight of a copper oxide.

10. Process according to claim 1, further comprising regenerating the adsorbent after adsorption of the impurity.

11. Process according to claim 1, wherein the adsorbent is divided into two separate zones, one of the zones allowing the impurity to be adsorbed while the other zone is being regenerated.

12. Apparatus for the preparation of a flow which is substantially purified with respect to at least one of the impurities $O_2$ and CO, said flow comprising at least 90 mol % of a compound selected from the group consisting of nitrogen, helium, neon, argon, krypton, xenon, or a mixture thereof, said apparatus comprising:

a source of the flow to be purified;

at least one adsorption zone having an inlet and an outlet, and comprising an adsorbent for adsorbing at least one of the impurities $O_2$ and CO, said adsorbent comprising at least one porous metal oxide;

first conduit means for fluidly connecting the source of flow to be purified to the inlet of the adsorption zone;

a storage tank for storing the flow which is purified with respect to at least one of the impurities; and second conduit means for fluidly connecting the outlet of the adsorption zone to the storage tank.

13. Apparatus according to claim 12, wherein the source of the flow to be purified is impure argon originating from an argon production unit comprising a double air distillation column coupled to a column for producing impure argon.

14. Apparatus according to claim 13, wherein the column for producing the impure argon includes 100–130 theoretical plates.

15. Apparatus according to claim 12, including two adsorption zones mounted in parallel.

* * * * *